(12) United States Patent
Huang et al.

(10) Patent No.: US 12,501,087 B2
(45) Date of Patent: Dec. 16, 2025

(54) ADAPTIVE BITRATE STREAMING USING VIDEO QUALITY INFORMATION

(71) Applicant: Beijing YoJaJa Software Technology Development Co., Ltd., Beijing (CN)

(72) Inventors: Lemei Huang, Beijing (CN); Tongyu Dai, Beijing (CN); Wenhao Zhang, Beijing (CN); Si Chen, Beijing (CN); Chenyu Tian, Beijing (CN)

(73) Assignee: BEIJING HULU SOFTWARE TECHNOLOGY DEVELOPMENT CO., LTD., Beijing (CN)

( * ) Notice: Subject to any disclaimer, the term of this patent is extended or adjusted under 35 U.S.C. 154(b) by 113 days.

(21) Appl. No.: 18/531,560

(22) Filed: Dec. 6, 2023

(65) Prior Publication Data

US 2025/0119602 A1 Apr. 10, 2025

(30) Foreign Application Priority Data

Oct. 7, 2023 (CN) .......................... 202311286724.2

(51) Int. Cl.
*H04N 21/238* (2011.01)
*H04N 21/24* (2011.01)
*H04N 21/262* (2011.01)

(52) U.S. Cl.
CPC ....... *H04N 21/238* (2013.01); *H04N 21/2402* (2013.01); *H04N 21/26225* (2013.01)

(58) Field of Classification Search
CPC ............. H04N 21/238; H04N 21/2402; H04N 21/26225; H04N 21/23439; H04N 21/8456
See application file for complete search history.

(56) References Cited

U.S. PATENT DOCUMENTS

| | | | | |
|---|---|---|---|---|
| 6,002,394 A | * | 12/1999 | Schein ................. | H04N 7/0884 348/E7.024 |
| 6,177,931 B1 | * | 1/2001 | Alexander ....... | H04N 21/42204 348/E7.071 |
| 7,992,161 B2 | * | 8/2011 | Meadows .......... | H04N 21/6582 725/23 |

(Continued)

FOREIGN PATENT DOCUMENTS

| EP | 3993365 A1 | 5/2022 |
|---|---|---|
| EP | 4171037 A1 | 4/2023 |
| EP | 4535795 A2 | 4/2025 |

OTHER PUBLICATIONS

Partial European Search Report, EP Patent Application No. 24200879, mailed Jan. 28, 2025, 14 pages.

(Continued)

*Primary Examiner* — Michael B. Pierorazio
(74) *Attorney, Agent, or Firm* — Kwan & Olynick LLP

(57) ABSTRACT

In some embodiments, a method receives quality metric values for profile levels in a plurality of profile levels for a segment of content. An available bandwidth and associated bitrates of profile levels in the plurality of profile levels are evaluated to select a first profile level. The quality metric values for profile levels in the plurality of profile levels are evaluated to select a second profile level. The method selects a profile level in the plurality of profile levels based on the first profile level and the second profile level. The profile level that is selected is requested for the segment.

20 Claims, 11 Drawing Sheets

(56) References Cited

U.S. PATENT DOCUMENTS

| | | | | |
|---|---|---|---|---|
| 8,713,603 B2* | 4/2014 | Kilar | H04N 7/17318 | 725/32 |
| 9,100,683 B2* | 8/2015 | Bhogal | H04N 21/4436 | |
| 10,070,193 B2* | 9/2018 | Newman | H04N 21/812 | |
| 10,701,452 B2* | 6/2020 | Newman | H04N 21/4828 | |
| 11,394,620 B1* | 7/2022 | Brailovskiy | H04L 41/147 | |
| 2002/0174430 A1* | 11/2002 | Ellis | H04N 21/4753 | 386/230 |
| 2003/0120541 A1* | 6/2003 | Siann | G06Q 30/02 | 705/14.69 |
| 2003/0149618 A1* | 8/2003 | Sender | G06Q 30/0277 | 705/26.1 |
| 2003/0149975 A1* | 8/2003 | Eldering | H04N 21/4532 | 348/E7.071 |
| 2004/0255322 A1* | 12/2004 | Meadows | H04N 21/2543 | 725/23 |
| 2005/0132398 A1* | 6/2005 | Baran | G06Q 30/04 | 348/E7.071 |
| 2006/0048184 A1* | 3/2006 | Poslinski | H04N 21/4542 | 348/E5.112 |
| 2006/0253417 A1* | 11/2006 | Brownrigg | G06F 16/9535 | |
| 2007/0104456 A1* | 5/2007 | Craner | H04N 21/44231 | 348/E5.112 |
| 2007/0157237 A1* | 7/2007 | Cordray | H04N 21/47 | 725/89 |
| 2007/0174336 A1* | 7/2007 | Day | H04N 21/4583 | 348/E7.071 |
| 2008/0022298 A1* | 1/2008 | Cavicchia | H04N 21/4524 | 725/112 |
| 2008/0115161 A1* | 5/2008 | Kurzion | G06Q 30/02 | 725/62 |
| 2008/0187279 A1* | 8/2008 | Gilley | H04N 21/47202 | 386/250 |
| 2008/0221986 A1* | 9/2008 | Soicher | G06Q 30/0277 | 705/14.56 |
| 2008/0235587 A1* | 9/2008 | Heie | H04N 7/142 | 709/231 |
| 2008/0235733 A1* | 9/2008 | Heie | H04N 21/482 | 725/46 |
| 2008/0271078 A1* | 10/2008 | Gossweiler | H04N 21/47 | 725/40 |
| 2009/0217316 A1* | 8/2009 | Gupta | H04L 65/762 | 705/14.66 |
| 2009/0304361 A1* | 12/2009 | Chan | H04N 21/4147 | 386/356 |
| 2009/0310937 A1* | 12/2009 | Ellis | H04N 21/4331 | 386/239 |
| 2010/0031162 A1* | 2/2010 | Wiser | H04N 21/431 | 715/747 |
| 2010/0186025 A1* | 7/2010 | Thomas | H04N 21/482 | 725/96 |
| 2010/0247067 A1* | 9/2010 | Gratton | H04N 21/4325 | 386/291 |
| 2011/0047569 A1* | 2/2011 | Mears | H04N 21/426 | 725/38 |
| 2011/0138053 A1* | 6/2011 | Khan | G06F 9/505 | 709/226 |
| 2011/0179453 A1* | 7/2011 | Poniatowski | G06F 16/78 | 725/58 |
| 2011/0307929 A1* | 12/2011 | Youssefmir | H04N 21/2402 | 725/89 |
| 2012/0066371 A1* | 3/2012 | Patel | H04L 67/1031 | 709/224 |
| 2012/0110620 A1* | 5/2012 | Kilar | H04N 21/812 | 725/34 |
| 2012/0117103 A1* | 5/2012 | Farrelly | H04L 67/10 | 707/769 |
| 2012/0117339 A1* | 5/2012 | Kandekar | G06F 16/13 | 711/159 |
| 2012/0284745 A1* | 11/2012 | Strong | H04N 21/812 | 725/34 |
| 2013/0133009 A1* | 5/2013 | Bhogal | H04N 21/4147 | 725/58 |
| 2013/0139196 A1* | 5/2013 | Sokolov | H04N 21/6175 | 725/25 |
| 2013/0219435 A1* | 8/2013 | Pattison | H04N 7/20 | 348/731 |
| 2013/0286879 A1 | 10/2013 | Elarabawy et al. | | |
| 2016/0234078 A1* | 8/2016 | Jana | H04L 47/25 | |
| 2016/0301964 A1* | 10/2016 | Laliberte | G06Q 30/0207 | |
| 2016/0323643 A1* | 11/2016 | Panchaksharaiah | H04N 21/4753 | |
| 2017/0055012 A1 | 2/2017 | Phillips et al. | | |
| 2018/0176622 A1* | 6/2018 | Sheppard | H04N 21/252 | |
| 2019/0313161 A1* | 10/2019 | Wilms | H04N 21/8456 | |
| 2021/0366158 A1* | 11/2021 | Sugio | H04N 19/597 | |
| 2023/0088688 A1* | 3/2023 | Grois | H04L 65/70 | 709/231 |

OTHER PUBLICATIONS

Troncoso Lora, A., Riquelme, J. C., Martínez Ramos, J. L., Riquelme Santos, J. M., & Gómez Expósito, A. (2003). Influence of kNN-based load forecasting errors on optimal energy production. In Progress in Artificial Intelligence: 11th Portuguese Conference on Artificial Intelligence, EPIA 2003, Beja, Portugal, Dec. 4-7, 2003. Proceedings 11 (pp. 189-203). Springer Berlin Heidelberg.

Extended European Search Report, European Patent Application 24 200 879.5, mailed Apr. 22, 2025, 15 pages.

* cited by examiner

```
<Representation id="1" bandwidth="238803" quality="23">
   <SegmentList duration="10">
      <SegmentURL media="rep_1_seg_1.mp4" quality="22" />
      <SegmentURL media="rep_1_seg_2.mp4" quality="21" />
      <SegmentURL media="rep_1_seg_3.mp4" quality="23" />
   </SegmentList>
</Representation>
<Representation id="2" bandwidth="452384" quality="43">
   <SegmentList duration="10">
      <SegmentURL media="rep_2_seg_1.mp4" quality="43" />
      <SegmentURL media="rep_2_seg_2.mp4" quality="45" />
      <SegmentURL media="rep_2_seg_3.mp4" quality="42" />
   </SegmentList>
</Representation>
<Representation id="3" bandwidth="1274909" quality="83">
   ...
</Representation>
```

FIG. 5

```
In multivariant_playlist.m3u8:

...                                                                    ⎽602
#EXT-X-STREAM-INF:BANDWIDTH=238803,AVERAGE-
BANDWIDTH=145789,…,AVERAGE-QUALITY=23
media_playlist1.m3u8                                                   ⎽604
#EXT-X-STREAM-INF:BANDWIDTH=452384,AVERAGE-
BANDWIDTH=237305,…,AVERAGE-QUALITY=43
media_playlist2.m3u8                                                   ⎽606
#EXT-X-STREAM-INF:BANDWIDTH=1274909,AVERAGE-
BANDWIDTH=1083742,…,AVERAGE-QUALITY=83
media_playlist3.m3u8
...
                    ⎽608
In media_playlist1.m3u8:

...
#EXTINF:5.005,      ⎽610
#EXT-X-QUALITY:22,
rep_1_seg_1.mp4     ⎽612
#EXTINF:5.005,
#EXT-X-QUALITY:21,
rep_1_seg_2.mp4     ⎽614
#EXTINF:5.005,
#EXT-X-QUALITY:22,
rep_1_seg_3.mp4
```

FIG. 6

| Profile level | Rebuffering time (s) | Bitrate (kbps) | Quality (VMAF) | Score for bitrate ($\mu_b = 200$) | Score for quality ($\mu_q = 10$) |
|---|---|---|---|---|---|
| 0 | 0 | 200 | 48.88 | 200 | 48.88 |
| 1 | 0 | 400 | 61.77 | 400 | 61.77 |
| 2 | 0 | 650 | 72.11 | 650 | 72.11 |
| 3 | 0 | 1000 | 75.84 | 1000 | 75.84 |
| 4 | 0 | 1500 | 89.66 | 1500 | 89.66 |
| 5 | 0 | 2000 | 90.25 | 2000 | 90.25 |
| 6 | 2 | 2500 | 90.68 | 2100 | 70.68 |
| 7 | 6 | 3200 | 90.99 | 2000 | 30.99 |

FIG. 8

ADAPTIVE BITRATE STREAMING USING VIDEO QUALITY INFORMATION

CROSS REFERENCE TO RELATED APPLICATIONS

Pursuant to 35 U.S.C. § 119 (a), this application is entitled to and claims the benefit of the filing date of Chinese Application No. 2023112867242 filed Oct. 7, 2023 in China, entitled "ADAPTIVE BITRATE STREAMING USING VIDEO QUALITY INFORMATION", the content of which is incorporated herein by reference in its entirety for all purposes.

BACKGROUND

In adaptive bitrate streaming, content (e.g., a video or audio) is divided into segments. Then, the segments are encoded at multiple levels, which may be referred to as profile levels. Each profile level may be associated with a different characteristic, which may be based on bitrate or quality. A content provider may use a content delivery network to deliver the segments to client devices. An adaptive bitrate algorithm may monitor the available bandwidth and dynamically adjust the profile level that is requested for content. The adaptive bitrate algorithm may ensure that an optimal viewing experience occurs at the client device because the client device may request a profile level that may be considered optimal for the available bandwidth.

A content delivery network may charge the content provider based on the amount of data that is transferred. The amount charged may be based on a rate times the amount of data that is transferred during a period. In some examples, content delivery networks may charge more during certain periods of the day, which may be referred to as a peak period. For example, a peak period may be considered a time in the evening when a large number of client devices are streaming content via playback sessions. A non-peak period may be during the day when a large number of users are not streaming content, which results in a smaller number of active playback sessions. Accordingly, for a content provider, transferring a large amount of data during a peak period may result in higher costs.

The amount of data that is transferred may depend on the profile level that is being selected. For example, a higher profile level may have a higher bitrate and quality, and thus use more bitrate to transfer the data through the content delivery network. In contrast, using a lower profile level may use less bitrate. The content delivery network may measure the amount of data based on bytes that are transferred. Thus, the costs would thus be lower if a lower quality profile level with a lower bitrate is used compared to a higher quality profile level with a higher bitrate. However, the adaptive bitrate algorithm is configured to request a profile level that is based on the available bandwidth and may determine a profile level with a highest possible bitrate that is predicted to not cause rebuffering.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

FIG. 5 depicts an example of sending the peak period and quality metric values using the DASH Protocol according to some embodiments.

FIG. 6 depicts an example of a playlist for sending the quality metric values using the HLS protocol according to some embodiments.

FIG. 8 depicts a table of calculated scores according to some embodiments.

DETAILED DESCRIPTION

Described herein are techniques for a content delivery system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

System Overview

A content delivery system may determine a profile level to select based on available bitrate and quality. In contrast to only using bitrate, an adaptive bitrate algorithm may also consider quality when selecting a profile level during the delivery of content. For example, the adaptive bitrate algorithm may determine whether a marginal gain in quality from a first profile level with a lower bitrate to a second profile level with a higher bitrate may not make selecting the second profile level with a higher bitrate necessary. Selecting the first profile level may save bandwidth usage, such as during a peak period, which may transfer less data and thus incur less cost. Also, using a lower profile level may use less bandwidth than the current available bandwidth, which may allow a buffer to buffer more data. Having a larger buffer of data may improve the delivery of content because having more data in the buffer may allow playback of the content to be more resilient to any changes in bandwidth in the future. For example, a network interruption may not affect playback as much when the data from the buffer may be used while the interruption is resolved. Also, during peak periods, a network may be more congested and using a lower profile level may improve the delivery of the content by not using as much bandwidth, but the quality may be similar. The cost to deliver the content may also be reduced during peak periods.

System

Figure 1:
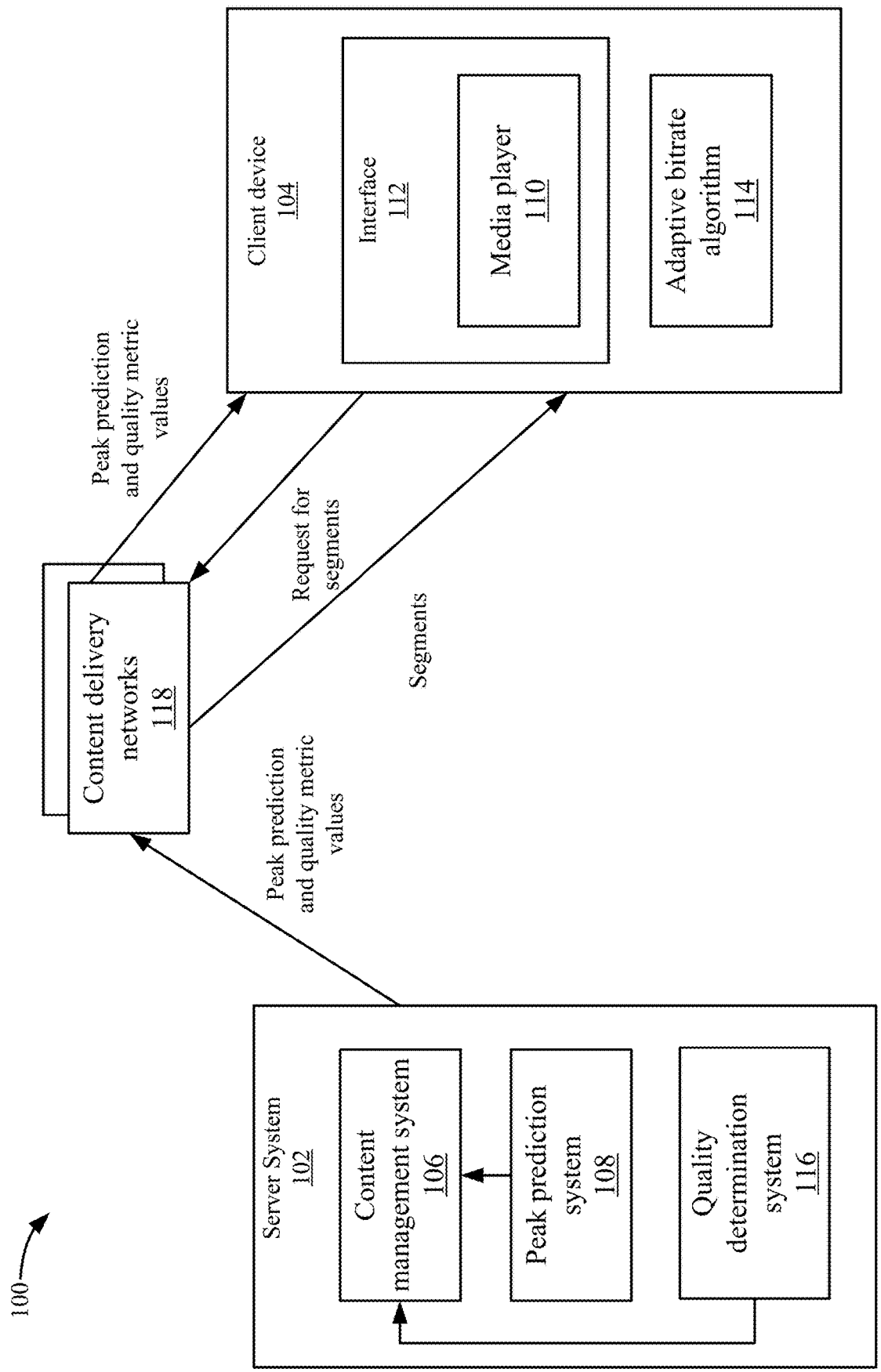
FIG. 1 depicts a simplified system performing an adaptive bitrate algorithm that uses bitrate and quality according to some embodiments.

FIG. 1 depicts a simplified system 100 performing an adaptive bitrate algorithm that uses bitrate and quality according to some embodiments. System 100 includes a server system 102 and a client device 104. Although a single instance of server system 102 and client device 104 are shown, multiple instances of server system 102 and client device 104 may be appreciated. For example, multiple client devices 104 may be requesting content from a single server system 102 or multiple server systems 102.

Server system 102 includes a content management system 106 that may facilitate the delivery of content to client device 104. For example, content management system 106 may communicate with multiple content delivery networks 118 (also referred to as a content delivery network 118) to have content delivered to multiple client devices 104. A content delivery network 118 includes servers that can deliver content to client device 104. The content may be video, audio, or other types of content. Video may be used for discussion purposes, but other types of content may be used in place of video. In some embodiments, content delivery network 118 delivers segments of video to client device 104. The segments may be a portion of the video, such as six seconds of the video. A video may be encoded in multiple profile levels that correspond to different levels, which may be different levels of bitrates or quality (e.g., resolution). Client device 104 may request a segment of video from one of the profile levels based on current network conditions. For example, client device 104 may use an adaptive bitrate algorithm to select the profile level for the video based on the estimated current available bandwidth and other network conditions.

Client device 104 may include a mobile phone, smartphone, set top box, television, living room device, tablet device, or other computing device. Client device 104 may include a media player 110 that is displayed on an interface 112. Media player 110 or client device 104 may request content from the content delivery network 118.

A profile ladder may be provided to client device 104 for segments that can be requested. The profile ladder may list different profile levels for each segment. An adaptive bitrate algorithm 114 may determine which profile level to select for each segment. Client device 104 can send requests for segments that are associated with a profile level. For example, client device 104 may use identifying information for a profile level to request a segment. Content delivery network 118 may then send the segment of video for the requested profile level to client device 104, which can then display the segment in media player 110 on interface 112. Client device 104 may change the profile levels that are requested for segments based on current network conditions.

A peak period prediction system 108 may predict when a peak period may occur. For example, there may be a peak period that may occur during a day. In some embodiments, the peak period may be defined by content delivery network 118 and may be based on a number of playback sessions that are presently active, such as a number of playback sessions may meet a threshold (e.g., above the threshold). For example, a content delivery network 118 may designate a period as being a peak period when an average of 1 million playback sessions are happening simultaneously in the period. Other criteria may be used to determine when a peak period occurs, such as a total count of playback sessions during a period. Content management system 106 may not know when a peak period may be designated by a content delivery network 118. Accordingly, peak period prediction system 108 may analyze historical data and determine when a peak period may be designated by a content delivery network 118. If there are multiple content delivery networks 118, peak period prediction system 108 may perform the same process for each content delivery network 118.

A quality determination system 116 may determine a quality metric value for profile levels. The quality metric value may be a numeric value that measures a quality characteristic. The quality metric value may indicate a perceived quality of content. In some embodiments, video multi-method assessment fusion (VMAF) may be used as a quality metric because it may have a high correlation with the perceived video quality. The perceived video quality may estimate the video quality that is perceived by a human user when watching the content. If the perceived quality difference is negligible, then a human user may not be able to tell the negligible difference in quality. Other metrics may also be used, such as peak signal to noise ratio (PSNR). The metric may be different from the parameters that are used to encode the profile levels of a segment, which may be bitrate and resolution. That is, VMAF is a metric that is different from resolution. Quality determination system 116 may analyze segments for each profile level and determine a quality metric value for each profile level of each segment.

Content management system 106 may provide the peak period prediction and the quality metric values to client device 104, such as via content delivery network 118. In some embodiments, the peak period prediction and quality metric values may be provided via a communication that is sent using a streaming protocol, such as dynamic adaptive streaming over HTTP (DASH) or HTTP live streaming (HLS). The streaming protocol may refer to the communication differently, such as a manifest in DASH or a playlist in HLS. The communication may send information that is needed to request segments for content for the playback session, such as links to segments in the content, control information (e.g., segment length, etc.), and other information. The peak period prediction and quality metric values may also be provided using other methods, such as in out-of-band communications in a control channel. The communications are sent in-band using DASH or HLS because the information for the peak periods and quality metric values are sent in manifests or playlists that are being sent to enable the streaming of content.

Adaptive bitrate algorithm 114 may use the peak period prediction and the quality metric values to determine a profile level to request for upcoming segments. As discussed above, adaptive bitrate algorithm 114 may incorporate the quality metric values in addition to the bitrate when selecting the profile level to request.

Figure 2A:
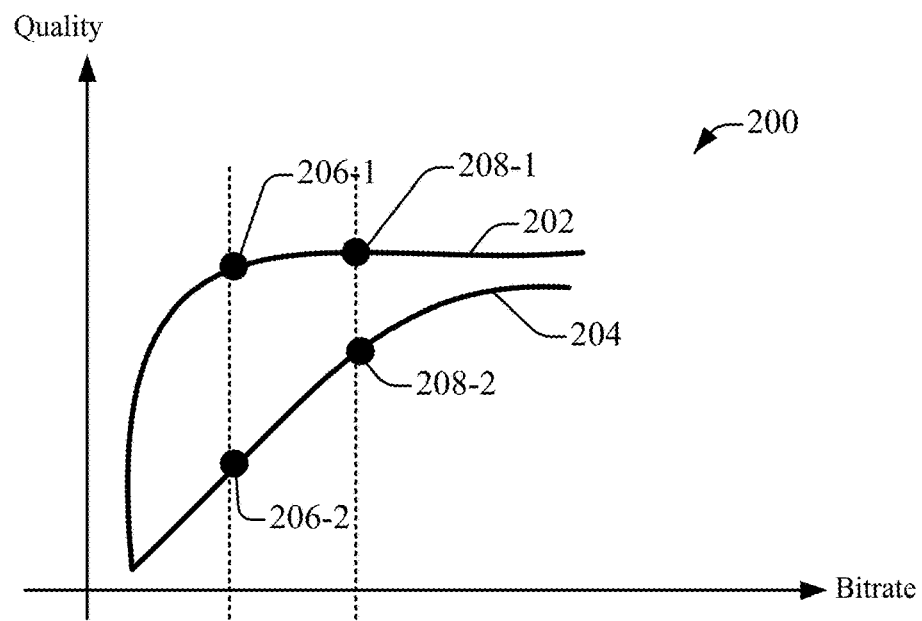
FIG. 2A shows a graph for selecting a profile level when the quality difference is minimal according to some embodiments.

FIG. 2A shows a graph 200 for selecting a profile level when the quality difference is minimal according to some embodiments. The Y-axis is a quality metric and the X-axis is bitrate. A first curve 202 is based on characteristics of a first instance of content and a second curve 204 is based on characteristics of a second instance of content. For curve 202, the difference in quality between selecting the first profile level at 206-1 and the second profile level at 208-1 is minimal and may not be perceived by a user. However, for curve 204, the change in quality between selecting the first profile level at 206-2 and the second profile level 208-2 is not minimal and may be perceived by a user. Although the term minimal is used, a threshold may be used to determine when a difference in quality is minimal (e.g., difference<threshold). Accordingly, when curve 202 occurs, the profile level with the lower bitrate at 206-1 may be selected. However, when curve 204 is encountered, the profile level at 208-2 may be selected with the higher bitrate because its perceived quality may be much more likely to be noticed by a user.

Figure 2B:
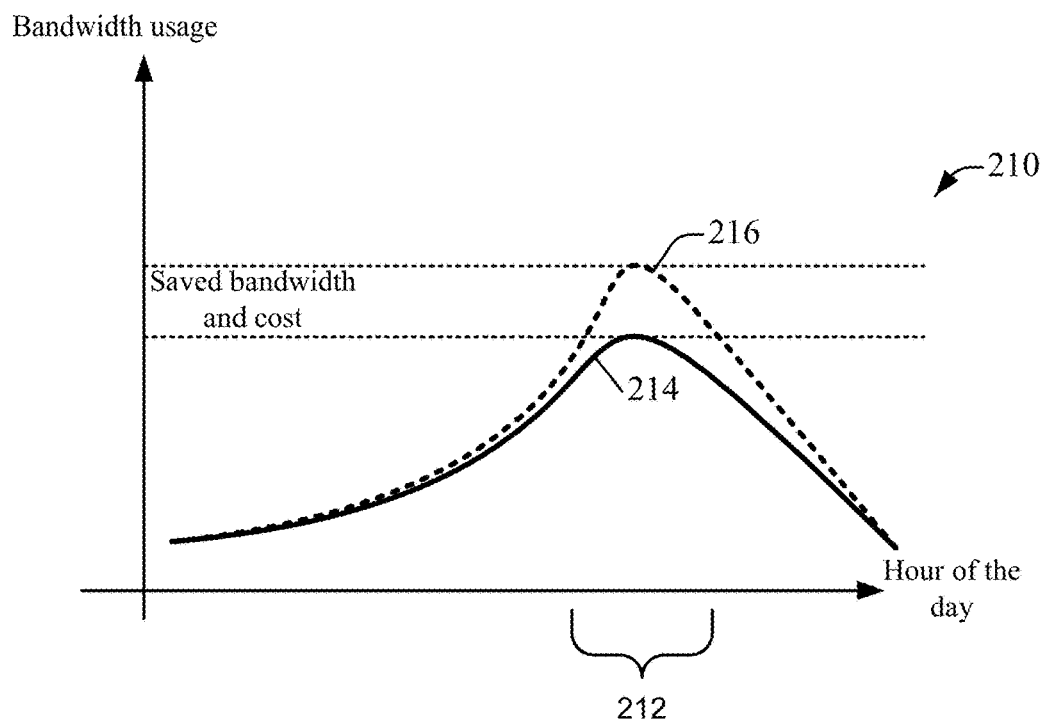
FIG. 2B depicts an example of the cost savings when using the quality metric value to select a profile level according to some embodiments.

FIG. 2B depicts an example of the cost savings when using the quality metric value to select a profile level according to some embodiments. The Y-axis may be bandwidth usage and the X-axis may be the hour of a day. During a peak period at 212, a curve 214 indicates the bandwidth usage when selecting the profile level at 206-1. A curve at 214 shows the bandwidth usage when selecting the profile level at 208-1. Accordingly, a saved cost occurs when selecting the profile level with the lower bitrate. However, the perceived quality difference is minimal and may not be perceived by a human user.

Peak Period and Quality Metric Values

Figure 3:
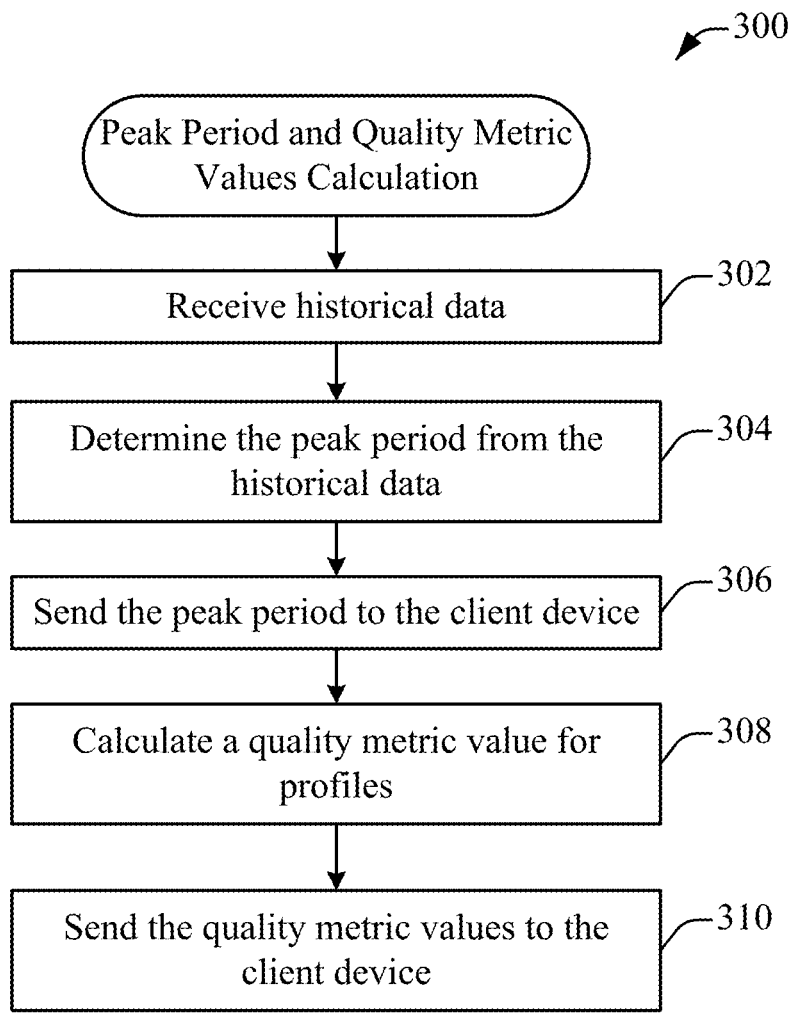
FIG. 3 depicts a simplified flowchart of a method for determining the peak period and quality metric values according to some embodiments.

The following will describe the determination of the peak period and quality metric values according to some embodiments. FIG. 3 depicts a simplified flowchart 300 of a method for determining the peak period and quality metric values according to some embodiments. At 302, server system 102 receives historical data. The historical data may be from a period, such as N Days, where N is a number. In some embodiments, the historical data may indicate a number of playback sessions that were active during portions of a day. In some embodiments, each day may have a cumulative playback session count for each hour of the day. Then, one or more hours that have a number of session counts above a threshold may be denoted as a peak hour. Other methods may also be used to determine the peak periods, such as analyzing the number of bytes that are transferred in a day, and periods with the largest number of bytes transferred are selected.

At 304, peak period prediction system 108 may determine the peak period from historical data. When the peak period is volatile, peak period prediction system 108 may use a prediction method to predict the peak period based on predicted traffic. In some embodiments, days $D_1 \ldots D_N$ are sorted by time and $D_N$ is the data of the latest day. Peak period prediction system 108 calculates a "distance" between days $D_N$ and $D_i$, i=1 ... N-1, where distance may be the Euclidean distance or other vector distance metrics. The variables $v_1 \ldots v_k$ are the k nearest days to the day N, sorted by closeness. The predicted traffic is:

$$\hat{D}_{N+1} = \frac{1}{\alpha_1 + \ldots + \alpha_k} \sum_{j=1}^{k} \alpha_j D_{v_j+1}$$

and $$\alpha_j = \frac{dist(D_N, D_{v_k}) - dist(D_N, D_{v_j})}{dist(D_N, D_{v_k}) - dist(D_N, D_{v_1})}.$$

Peak period prediction system 108 calculates the peak hour h in $D_{N+1}$, where [h−c, h+E] is the peak period, wherein h is the hour, and e is a parameter that is measured in hours and could be tuned.

In an example, there are two hours that can potentially be the peak hour, so the traffic data of one day indicates the active playback session count for each of the hours, and the historical data covers a period of N=5 days, which means there would be five 2-D vectors and each of them represents the traffic data of one day. Let k=3 and the data is shown in Table I:

TABLE I

| | Traffic data | dist($D_N$, $D_i$) | K nearest | $\alpha_j$ |
|---|---|---|---|---|
| $D_1$ | <8.5, 12> | 2.5 | $v_1$ | 1 |
| $D_2$ | <2, 4> | 10 | $v_4$ | — |
| $D_3$ | <7, 6> | 5 | $v_3$ | 0 |
| $D_4$ | <11.5, 8> | 2.5 | $v_2$ | 1 |
| $D_5$ | <10, 10> | 0 | | |

A first column lists the day, a second column lists the traffic data, a third column lists the distance between the day and the current day, a fourth column lists the variables $v_1 \ldots v_k$ that are the k nearest days to the day N, sorted by closeness, and a fifth column lists the value for the variable $a_j$. The predicted traffic data for day N+1 is a weighted average of $D_{v_j+1}$:

$$D_6 = \frac{1}{2}D_2 + \frac{1}{2}D_5 = [1, 2] + [5, 5] = [6, 7].$$

The value of [6,7] is thus the predicted active playback session count of each of the candidates for the peak hour. The second hour that has more sessions may be regarded as the peak hour of $D_6$. In practice, the candidates for the peak hour are usually all the hours of a day, so the traffic data for each day is 24-hour data, which means $D_i$ is a 24-dimension vector.

When the peak period of each day may become stable, such as from 7:00 PM to 9:00 PM, the peak period may be hard coded and not predicted for a period of time. Thereafter, additional historical data may be re-analyzed and the peak period may be redetermined.

At 306, server system 102 causes the peak period to be sent to client device 104, such via a content delivery network 118. As mentioned above, the peak period can be inserted in a communication that is sent during the playback session or in an out of band communication. Examples of sending the peak period will be described below.

At 308, quality determination system 116 calculates a quality metric value for the profile levels. The quality metric calculation may be performed in parallel with the peak period calculation, or in series. The quality metric value may be a numeric value that measures a quality characteristic of a segment for each profile level of content. As discussed above, VMAF may be used as a quality metric due to its high correlation with subjective ratings of perceived video quality that may be obtained through human evaluation. Quality determination system 116 may analyze the segments of an instance of content and assign a quality metric value to each profile level for a segment.

Figure 4:
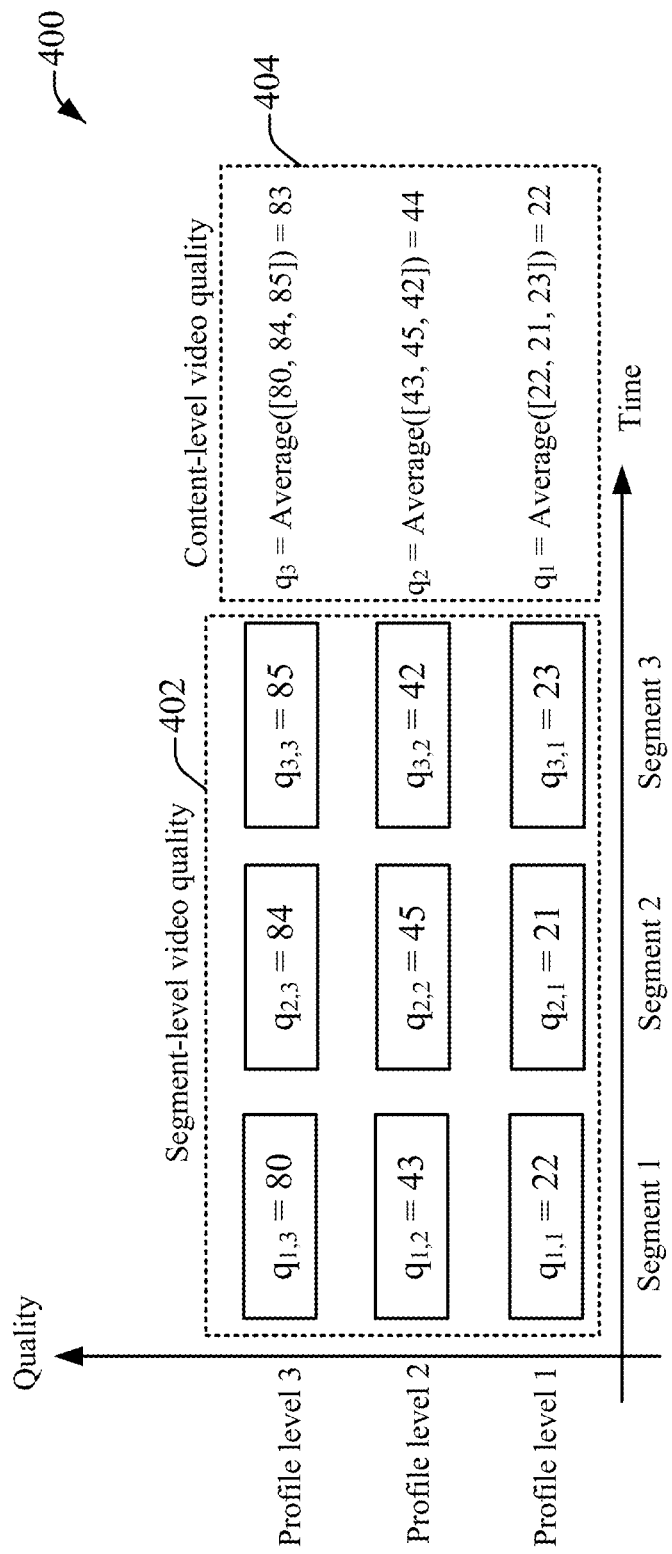
FIG. 4 depicts an example of quality metric values according to some embodiments.

At 310, server system 102 may cause the quality metric values to be sent to client device 104, such as via content delivery network 118. As mentioned above, the quality metric values can be inserted in a communication that is sent during the playback session or in an out of band communication. Examples of sending the quality metric values will be described below. FIG. 4 depicts an example of quality metric values according to some embodiments. A graph 400 shows the quality levels of three segments of segment 1, segment 2, and segment 3 at 402, but the instance of content may have multiple segments. The Y-axis shows the quality and the X-axis shows time in the instance of content. Also, a profile level 1, a profile level 2, a profile level 3 are shown, but other profile levels may be appreciated. Quality determination system 116 may analyze the content of a segment and assign a quality metric value to combinations of segments and profile levels. For example, the combination of segment 1, profile level 1 has a quality value of $q_{1,1}=22$; segment 1, wherein 1,1 is the segment and the profile identifier. Profile level 2 has a quality metric value of $q_{1,2}=43$, and segment 1, profile level 3 has a quality metric value of $q_{1,3}=80$. Segment 2 and segment 3 also have quality metric values assigned to respective profile levels.

At 404, a content-level quality metric value is shown. The content level quality metric may be the average for segments of one profile level of the instance of content. In some embodiments, the content-level quality metric value may be the average of respective quality metric scores for all the segments for a specific profile level. For example, a profile level 1 has an average of [22, 21, and 23]=22. Profile level 2 has an average of 44 and profile level 3 has an average of 83. In some cases when providing the segment-level quality metric is unacceptable, e.g., greatly increasing the manifest size due to too many segments, the content-level quality metric can be sent as a substitute to use for one or more segment-level quality metric values.

As mentioned above, the peak period and quality metric values may be sent using in-band communications during the playback session or via out of band communications. The communication may be sent using different protocols that are used to perform messaging during the playback session. Adaptive bitrate algorithm 114 may be configured to receive the quality metric values when a communication is received during the playback process. For DASH, a manifest file is sent that describes the segments that can be requested. For HLS, a multi-variant playlist and multiple media playlists may be sent to describe the profile levels and the segments that can be requested.

FIG. 5 depicts an example of sending the peak period and quality metric values using the DASH protocol according to some embodiments. In this example, the quality metric values are sent as a property of the DASH protocol. At 502, the average quality for a profile level 1 is sent using the representation tag. The average value is 23 for profile level 1. Then, at 504, the quality metric value for each segment for profile level 1 is sent using the segment URL property. For example, the quality metric value for segment 1, seg_1 is 22, for segment 2, seg_2 is 21, and for segment 3, seg_3 is 23.

The quality metric value for profile level 2 is shown as the average value of 43 at 506. Then, for profile level 2, at 508, the quality metric values for segments segment 1, segment 2, and segment 3 are 43, 45, and 42, respectively. Although the above quality metric values are sent using these properties, other properties may be used. Also, the peak period may be sent using another property or via a separate communication outside of the communications for the streaming protocol.

FIG. 6 depicts an example of a playlist 600 for sending the quality metric values using the HLS protocol according to some embodiments. The quality metric values may be sent using properties of HLS. The multi-variant playlist tag, EXT-X-Stream-INF, may be used to specify the content-level video quality with a new attribute of AVERAGE-QUALITY. A media playlist tag may be defined that specifies the segment level quality metric values for each segment. A media playlist tag EXT-X-Quality may specify the segment level quality metric of each segment. For example, at 602, the average quality is 23 for a first profile level; at 604, the average quality is 43 for a second profile level; and at 606, the average quality is 83 for a third profile level. Then, a media playlist tag of EXT-X-Quality specifies the segment level quality metric value of each segment. For example, at 608, a media playlist for a first profile level is shown. At 610, the quality metric value may be 22 for segment 1, at 612, the quality metric value may be 21 for segment 2, and at 614, the quality metric value may be 22 for segment 3. Also, the peak period may be sent using another property or via a separate communication outside of the communications for the streaming protocol.

The communications that are sent in FIG. 5 and FIG. 6 include other information that is used by client device 104 to request segments for playback during a playback session, such as using links to the segments. The quality metric values and the peak period may be communicated to client device 104 in these communications.

Profile Level Selection

Client device 104 may use adaptive bitrate algorithm 114 to select a profile level for one or more upcoming segments. Client device 104 may send a request for the segment at the selected profile level, and the segment is then delivered to client device 104 by content delivery network 118. Adaptive bitrate algorithm 114 uses the available bandwidth, the bitrate of segments, and the quality metric values of segments in its decision process to select a profile level.

Figure 7:
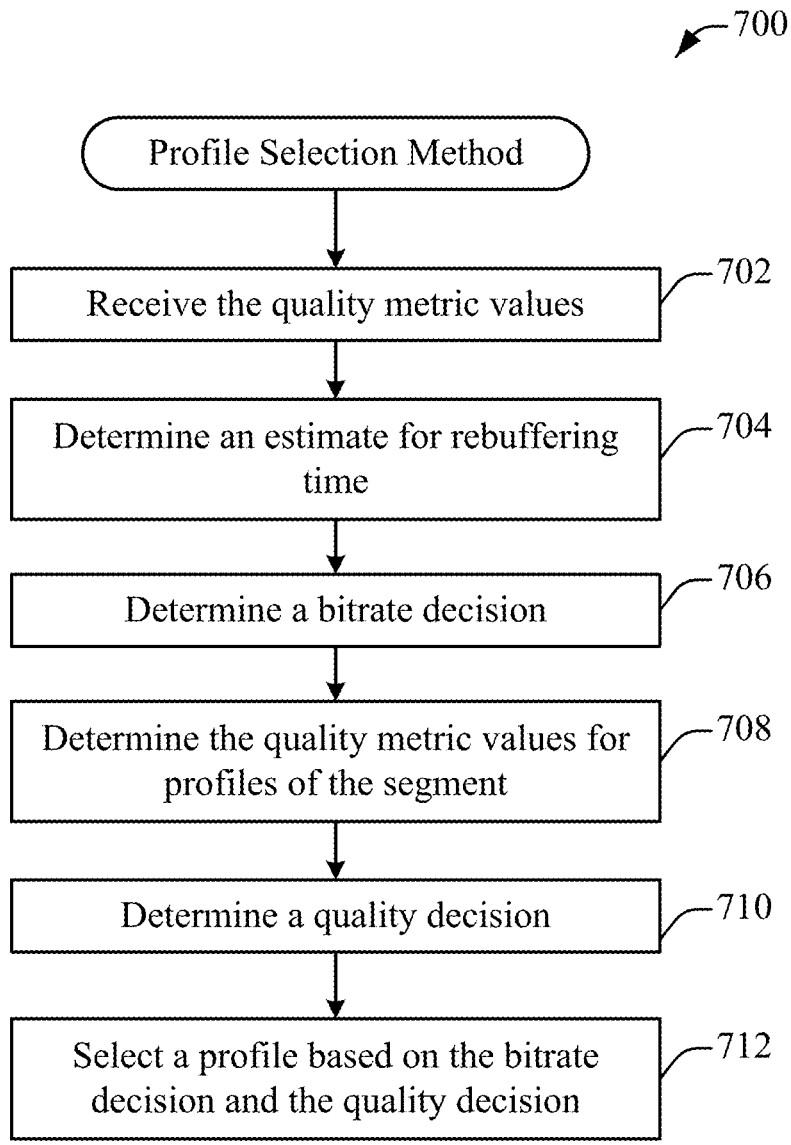
FIG. 7 depicts a simplified flowchart of a profile level selection method using an adaptive bitrate algorithm according to some embodiments.

FIG. 7 depicts a simplified flowchart 700 of a profile selection method using adaptive bitrate algorithm 114 according to some embodiments. At 702, client device 104 receives a communication with the quality metric values. As discussed above, the quality metric values may have been received in a communication that is sent using a streaming protocol.

At 704 adaptive bitrate algorithm 114 determines an estimate for rebuffering time. The estimate for rebuffering time may estimate the potential rebuffering time in a future period for each profile level. A rebuffer may occur when there is not enough data in a buffer to support continuous playback of content. The estimate of rebuffering time may be used to evaluate the risk of rebuffering when selecting different profile levels. The rebuffering time may be the amount of time in which rebuffering may occur in the future. For example, the rebuffering time may be three seconds. A zero rebuffering time may indicate that rebuffering may not occur. In some examples, adaptive bitrate algorithm 114 estimates the potential buffering time in a future period for each profile level. This step is to evaluate the risk of rebuffering when choosing different profile levels.

In some embodiments, adaptive bitrate algorithm 114 estimates the possible rebuffering time during downloading the future L segments, e.g., from segment i to i+L−1. Adaptive bitrate algorithm 114 may use logic that is formulated as a function, F (buf+Δ, B, i, j)=>$r_{ij}$, meaning that the rebuffering time during downloading segments i to i+L−1 with quality level j is calculated by the function F with the information of current buffer length buf, the buffer length offset Δ, and the estimated bandwidth B.

Adaptive bitrate algorithm 114 calculates the rebuffering time using the function F as follows. Adaptive bitrate algorithm 114 initializes $r_{ij}=0$, buf'=buf+Δ. For k from i to i+L−1: the download time of segment k, $$t = \frac{s_{kj}}{B},$$

where $s_{kj}$ is the size of segment k with quality level j. The estimated rebuffering time during downloading segment k is r=max (0, t−buf'). Adaptive bitrate algorithm 114 adds the rebuffering time to the result: $r_{ij}=r_{ij}+r$ and updates the buffer length: buf'=max (0, buf'−t)+$d_k$, where $d_k$ is the duration of segment k. Adaptive bitrate algorithm 114 calculates the rebuffering time $r_{ij}$ for every quality level $j \in [1, M]$, where the rebuffering time be an M-dimensional vector R.

The estimation method may simulate the buffer length changes. Adaptive bitrate algorithm 114 estimates the rebuffering time for L=3 segments in the future, such as to predict how long the rebuffering will last during the downloading of segments i, i+1, i+2. In the estimation, the estimated bandwidth B is constant for all segments at all quality levels.

In some examples, the current "adjusted" buffer length buf+$\Delta$ is one second, and the duration of each segment di is also constant at 5 seconds. The estimation simulates the following processes successively. For the downloading of segment i (e.g., from 0 s to 5 s), the estimated download time $$t = \frac{s_{kj}}{B}$$

is five seconds, which means from zero seconds to five seconds, the media player is downloading segment i. Parallel with the downloading, the content is still being played. Since there is only one second of the content in the buffer, the buffer will become empty after one second. The playback will stall and rebuffering will occur until there is new content received (the newly downloaded segment), for which the rebuffering time r is four seconds. The buffer will be filled with new content then and the buffer length will be five seconds, equal to the duration of segment i.

Adaptive bitrate algorithm 114 simulates the downloading of the segment i+1 (e.g., from five seconds to 11 seconds). The estimated buffer length before downloading the segment i+1 is five seconds. Similarly, the estimated download time is six seconds (because segment i+1 has a larger size). The rebuffering will occur at ten seconds and last for one second until the segment i+1 is finally downloaded at 11 seconds. The buffer will be filled with new content then and the buffer length will be five seconds, equal to the duration of segment i+1.

Adaptive bitrate algorithm 114 simulates the downloading of the segment i+2 (from 11 seconds to 15 seconds). The estimated download time is four seconds. Since the buffer still has five seconds of the content to be played, no rebuffering will occur until the segment i+2 is finally downloaded at 15 seconds. Therefore, the total estimated rebuffering time for quality j at segment i $r_{ij}$ is five seconds in total (four seconds for the segment i and 1 second for segment i+1).

At 706, adaptive bitrate algorithm 114 determines a bitrate decision. Adaptive bitrate algorithm 114 may use the bitrates for profile levels for a segment and the estimated rebuffering time to determine a profile level to select. Adaptive bitrate algorithm 114 may use a similar function to determine the bitrate decision and the quality decision that is described below. The function may use the bitrate when calculating the bitrate decision or a quality metric value when calculating the quality decision. The function estimates rebuffering time for profile levels, outputs scores, and selects a profile level based on the scores.

In some embodiments, the function is G (X, R, $\mu$, $\sigma$)=>j'. X={$x_j$} is an M-dimensional vector representing the bitrate of profile level j. When using bitrate, adaptive bitrate algorithm 114 sets $x_j$=$b_j$, that is, the bitrate of profile level j. Adaptive bitrate algorithm 114 estimates the rebuffering time R={$r_{ij}$} above at 704. The coefficient $\mu$ is a coefficient to combine X and R. The coefficient $\mu$ is different when X uses bitrate or the quality metric value, or may not be used.

This is because using the same value for $\mu$ will make the tradeoff between video bitrate and rebuffering time differ vastly from that between video quality and rebuffering time because the magnitude of bitrate and quality is different when compared with the rebuffering time. In the following example, when the unit of bitrate is kbps, $\mu$=200 means that one second of the rebuffing counteracts 200 kbps of the bitrate increase. Such an increase in video bitrate may be common and feasible. However, if this value of u is applied to quality metric like VMAF, which is usually in the range of 20-100, it means that one second of the rebuffing counteracts the VMAF increase of 200. Such an increase in video quality is not feasibly possible given the above normal range. A threshold $\sigma$ is a threshold to indicate whether two profile levels of the same segment have similar perceived quality, which means a first profile level $j_1$ and a second profile level $j_2$ could be regarded as having similar quality (e.g., within a threshold) when $|x_{j_1} - x_{j_2}| \leq 0$. The threshold $\sigma$ may be different when analyzing bitrate versus quality.

Adaptive bitrate algorithm 114 calculates the function G as follows. Adaptive bitrate algorithm 114 initializes the decision j'=1. For a profile level j from 1 to M: adaptive bitrate algorithm 114 calculates the score $s_j$ for this level: $s_j = x_j - \mu \times r_{ij}$. If profile level j could be distinguished from profile j' regarding bitrate, and has a higher score, e.g., $|x_{j'} - x_j| > 0$ and $s_j > S_i$, adaptive bitrate algorithm 114 selects the profile: j'=j. When using bitrate, adaptive bitrate algorithm 114 determines a profile level decision $j_b$=G ({$b_j$}, R, $\mu_b$, $\sigma_b$). To make the decision consistent with an adaptive bitrate algorithm that did not use the quality metric values, the threshold op may be set to be 0.

After determining the bitrate decision, adaptive bitrate algorithm 114 can determine a quality decision. At 708, adaptive bitrate algorithm 114 determines the quality metric values for profile levels of the segment.

At 710, adaptive bitrate algorithm 114 determines a quality decision. The quality decision may select a profile level. Using the function above, adaptive bitrate algorithm 114 can calculate another decision based on the quality metric value: $j_q$=G ({$q_{ij}$}, R, $\mu_q$, $\sigma_g$). When using the quality metric value, adaptive bitrate algorithm 114 sets $x_j$=$q_{ij}$, that is, the quality metric value of segment i with profile level j. If profile level j could be distinguished from profile j' regarding the quality metric value, and has a higher score, e.g., $|x_{j'} - x_j| > 0$ and $s_j > s_{j'}$, adaptive bitrate algorithm 114 selects the profile: j'=j. When using quality metric values, adaptive bitrate algorithm 114 determines a profile level decision $j_q$=G ({$q_{ij}$}, R, $\mu_q$, $\sigma_q$).

At 712, adaptive bitrate algorithm 114 selects a profile level based on the bitrate decision and the quality decision. Different methods may be used to select the profile level. In some embodiments, adaptive bitrate algorithm 114 may select the lower profile level of the profile levels that were selected from the bitrate decision and the quality decision. For example, adaptive bitrate algorithm 114 selects the lower profile level for segment i using min ($j_b$, $j_q$). In some examples, if a profile level 8 and a profile level 6 have been selected, adaptive bitrate algorithm 114 selects profile level 6 as the selected profile level. It is expected that profile level 6 may have a lower bitrate compared to profile level 8.

The following will describe an example of calculating the profile level using the bitrate decision and the quality decision. FIG. 8 depicts a table 800 of calculated scores according to some embodiments. Column 802 includes the profile level, column 804 includes the rebuffering times, column 806 includes the bitrate (kbps), column 808 includes the quality metric values (VMAF), column 810 includes the score for the bitrate decision, and column 812 includes the score for the quality decision. The scores for the bitrate decision and the quality decision may be affected by rebuffering times in profiles 6 and 7. For example, for profile 6, the rebuffering time of 2 seconds has a bitrate score of 2100 when the bitrate is 2500 and a quality score of 70.68 when the quality metric value is 90.68.

After scoring, the bitrate decision and the quality decision depend on the thresholds $\sigma_b$ and $\sigma_g$. As discussed above, to make the decision consistent with an adaptive bitrate algorithm that did not use quality metric values, the threshold $\sigma_b$ may be set to be 0. Therefore, the bitrate decision will be the profile level 6 with the highest score of 2100 at 814.

For the quality decision, adaptive bitrate algorithm 114 determines that the marginal increase of the quality metric value when upgrading the profile level becomes very small from profile level 4 to profile level 8 in column 808 (e.g., the quality metric values are 89.66, 90.25, 90.68, and 90.99, respectively). If the threshold is $\sigma_q=0$, the quality decision will be profile level 5 with the highest score of 90.25 at 816. If $\sigma_g=1$, which is possible because it may be hard to perceive for human users when the quality metric score varies within one, the quality decision will be profile level 4, because there is not a quality level j' which has a higher score than profile level 4, and a quality metric with $|x_{j'}-x_4|>1$ . . . . Profile level 5 has a quality metric score of 90.25, which has a difference from the value of 89.66 of below one. Thus, profile 4 is selected because profile 4 has a lower bitrate.

If the profile level for the quality decision is a lower level than the profile level determined by the bitrate decision, adaptive bitrate algorithm 114 may update the buffer length offset that is used in the bitrate decision and the quality decision to add the saved download time to buffer length offset that results from using the profile level that is lower. That is, using a lower profile level than that would have been normally selected without considering the quality metric values may increase the buffer length as there may be more available bandwidth considering the bitrate of the lower profile level compared to a bitrate of a higher profile level. By adding the buffer length that is saved to the buffer length offset, adaptive bitrate algorithm 114 may not know there is more buffer length available, which avoids a switch to a higher than desired profile level the next time the adaptive bitrate algorithm is evaluated.

By adding the buffer length to the buffer length offset, additional buffer length may be added to cope with any potential network problems in the future. This may improve the playback process as the buffer may have additional buffer length that is resilient to abrupt changes in the network conditions. The logic to add the additional buffer length may be as follows. Adaptive bitrate algorithm 114 calculates the saved download time:

$$d = \max\left(\frac{s_{ij_b} - s_{ij_q}}{B}, 0\right).$$

Then, adaptive bitrate algorithm 114 adds the saved download time to the buffer length offset: $\Delta=\Delta+d$. Following the previous example, when the threshold $\sigma_b=0$ and the threshold $\sigma_q=1$, the bitrate decision is $j_b=6$ and the quality decision is $j_q=4$, so the final selected quality level would be min ($j_b$, $j_q$)=4, and the buffer length offset will be updated as $$\Delta = \Delta + \max\left(\frac{s_{i6} - s_{i4}}{B}, 0\right).$$

Peak Period

Figure 9:
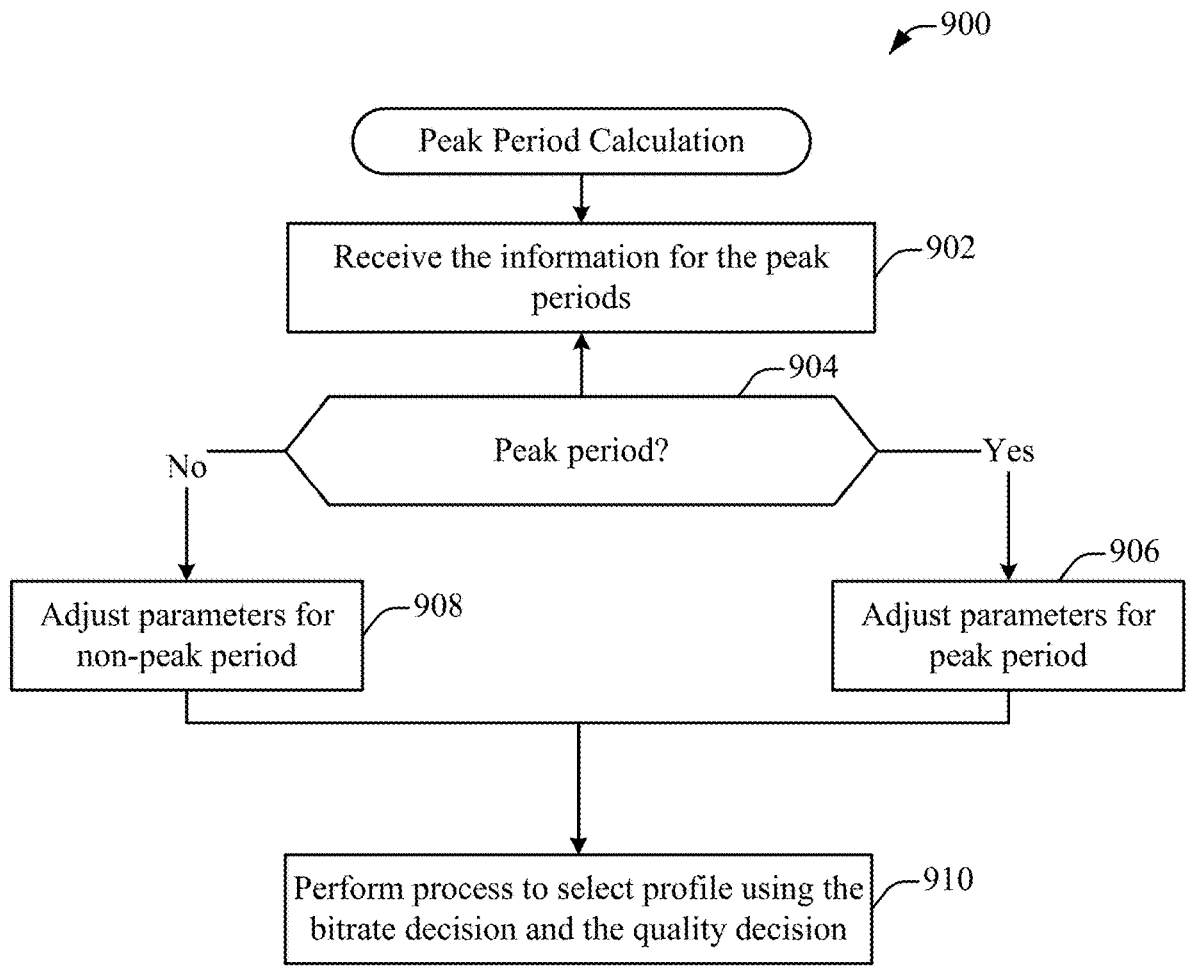
FIG. 9 depicts a simplified flowchart of a method for performing an adaptive bitrate algorithm based on peak periods according to some embodiments.

The method of FIG. 9 may be performed based on when a peak period is specified. For example, the process may be more aggressive in reducing the bitrate during peak periods.

FIG. 9 depicts a simplified flowchart 900 of a method for performing an adaptive bitrate algorithm based on peak periods according to some embodiments. At 902, adaptive bitrate algorithm 114 receives information for the peak periods. As discussed above, the information for the peak periods may be received in a communication, such as via a manifest or a playlist, or an out of band communication.

At 904, adaptive bitrate algorithm 114 determines if a peak period is being experienced at a future time. For example, a peak period may indicate an hour of the day, minutes in a day, a portion of the day, etc. When a peak period is upcoming, at 906, adaptive bitrate algorithm 114 adjusts parameters for the peak period. For example, adaptive bitrate algorithm 114 may adjust parameters in the bitrate decision or the quality decision based on a peak period being experienced. In some embodiments, when in a peak period, adaptive bitrate algorithm 114 may adjust a parameter to loosen the requirements for determining the similarity in quality metric values between two profile levels to save more bandwidth. For example, adaptive bitrate algorithm 114 can preset two thresholds $\sigma_1<\sigma_2$ as the values for the threshold of $\sigma_g$. When it is in a peak period, adaptive bitrate algorithm 114 sets the threshold $\sigma_q=\sigma_2$ to loosen the requirements for determining the similarity in video quality between two quality levels, which then may save more bandwidth usage. Otherwise, at 908, when it is in the non-peak period, adaptive bitrate algorithm 114 sets the threshold $\sigma_q=\sigma_1$ to obtain higher quality. That is, by setting the threshold $\sigma_q$ equal to the threshold $\sigma_2$, adaptive bitrate algorithm 114 may allow for more quality difference between profile levels to save more bandwidth. Otherwise, if not in a peak period, then the threshold Og equal to the threshold $\sigma_1$, which is less than threshold $\sigma_2$. The lower value may emphasize selecting profile levels for higher quality video. For example, the threshold $\sigma_1$ may select a profile level with higher quality rather than save bandwidth.

At 910, adaptive bitrate algorithm 114 performs a process to select a profile level using the bitrate decision and the quality decision. If not in a peak period, the parameter for the non-peak period may be used for the bitrate decision and the quality decision. If a peak period is being experienced, then the parameter for the peak period may be used in the bitrate decision and the quality decision. Other processes may also be used. For example, when not in a peak period, the quality decision may not be calculated. Rather, the profile level that is determined by the bitrate decision may only be used.

CONCLUSION

Accordingly, adaptive bitrate algorithm 114 may reduce the average bitrate during peak periods while also maintaining a similar perceived quality. Thus, bandwidth is saved during the peak periods, which may lower costs. However, the perceived quality may be similar and not perceptible by a user. Additionally, adjustments to the buffer offset may be used such that the buffer length may increase. The increased buffer length may improve the playback performance by reducing the rebuffering that may occur.

System

Figure 10:
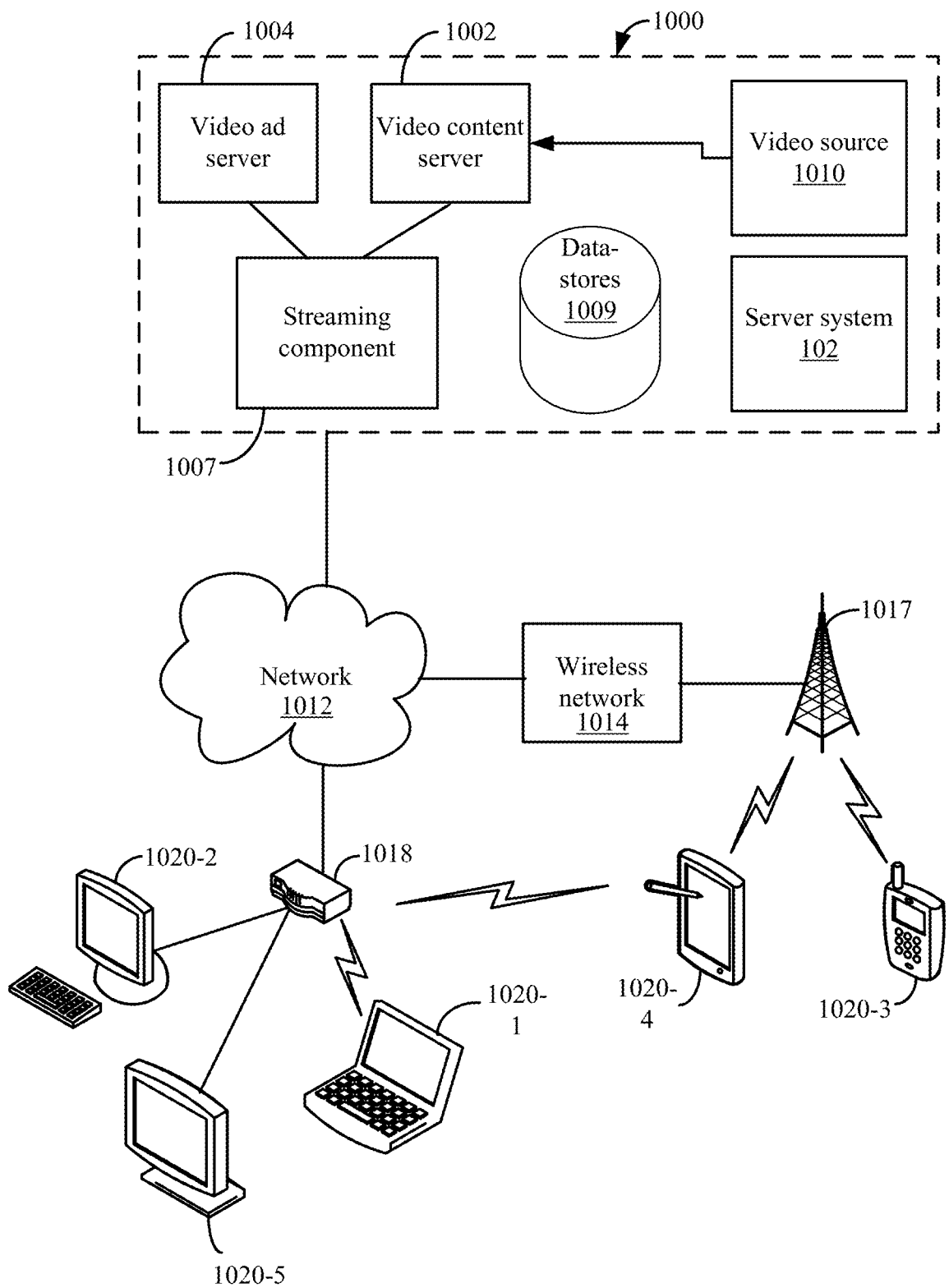
FIG. 10 depicts a video streaming system in communication with multiple client devices via one or more communication networks according to one embodiment.

Features and aspects as disclosed herein may be implemented in conjunction with a video streaming system 1000 in communication with multiple client devices via one or more communication networks as shown in FIG. 10. Aspects of the video streaming system 1000 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 1000, video data may be obtained from one or more sources for example, from a video source 1010, for use as input to a video content server 1002. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner or transcoder. The input video data may comprise video clips or programs of various types, for example, television episodes, motion pictures, and other content produced as primary content of interest to consumers. The video data may also include audio or only audio may be used.

The video streaming system 1000 may include one or more computer servers or modules 1002, 1004, and 1007 distributed over one or more computers. Each server 1002, 1004, 1007 may include, or may be operatively coupled to, one or more data stores 1009, for example databases, indexes, files, or other data structures. A video content server 1002 may access a data store (not shown) of various video segments. The video content server 1002 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 1004 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 1000, a public service message, or some other information. The video advertising server 1004 may serve the video advertising segments as directed by a user interface controller (not shown).

The video streaming system 1000 also may include server system 102.

The video streaming system 1000 may further include an integration and streaming component 1007 that integrates video content and video advertising into a streaming video segment. For example, streaming component 1007 may be a content server or streaming media server. A controller (not shown) may determine the selection or configuration of advertising in the streaming video based on any suitable algorithm or process. The video streaming system 1000 may include other modules or units not depicted in FIG. 10, for example, administrative servers, commerce servers, network infrastructure, advertising selection engines, and so forth.

The video streaming system 1000 may connect to a data communication network 1012. A data communication network 1012 may comprise a local area network (LAN), a wide area network (WAN), for example, the Internet, a telephone network, a wireless network 1014 (e.g., a wireless cellular telecommunications network (WCS)), or some combination of these or similar networks.

One or more client devices 1020 may be in communication with the video streaming system 1000, via the data communication network 1012, wireless network 1014, or another network. Such client devices may include, for example, one or more laptop computers 1020-1, desktop computers 1020-2, "smart" mobile phones 1020-3, tablet devices 1020-4, network-enabled televisions 1020-5, or combinations thereof, via a router 1018 for a LAN, via a base station 1017 for wireless network 1014, or via some other connection. In operation, such client devices 1020 may send and receive data or instructions to the system 1000, in response to user input received from user input devices or other input. In response, the system 1000 may serve video segments and metadata from the data store 1009 responsive to selection of media programs to the client devices 1020. Client devices 1020 may output the video content from the streaming video segment in a media player using a display screen, projector, or other video output device, and receive user input for interacting with the video content.

Distribution of audio-video data may be implemented from streaming component 1007 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth, and structure of those files, delivers just the amount of data necessary to play the video, at the rate needed to play it. Streaming media servers may also account for the transmission bandwidth and capabilities of the media player on the destination client. Streaming component 1007 may communicate with client device 1020 using control messages and data messages to adjust to changing network conditions as the video is played. These control messages can include commands for enabling control functions such as fast forward, fast reverse, pausing, or seeking to a particular part of the file at the client.

Since streaming component 1007 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 1007 may use TCP-based protocols, such as HyperText Transfer Protocol (HTTP) and Real Time Messaging Protocol (RTMP). Streaming component 1007 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 11:
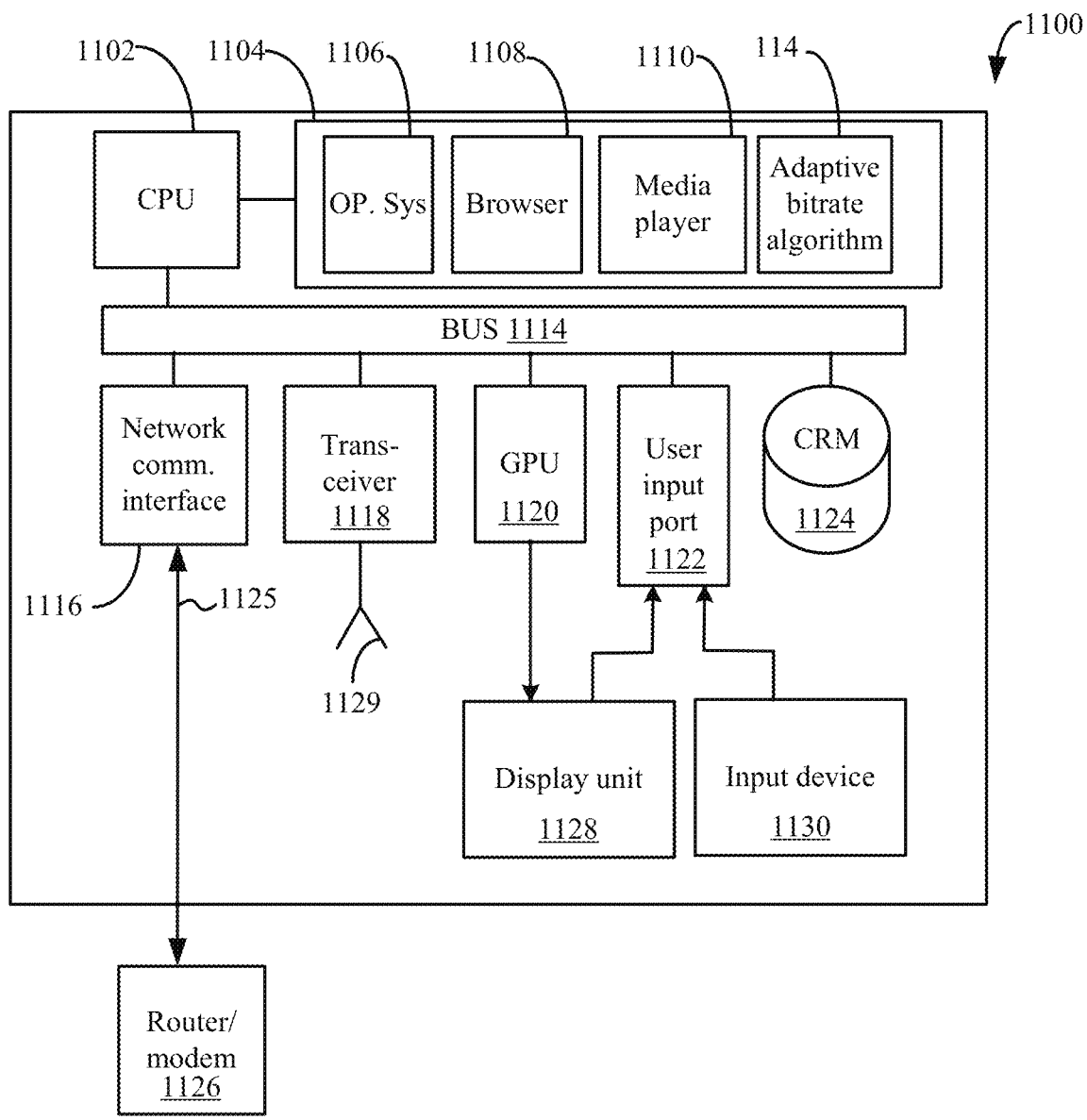
FIG. 11 depicts a diagrammatic view of an apparatus for viewing video content and advertisements.

Referring to FIG. 11, a diagrammatic view of an apparatus 1100 for viewing video content and advertisements is illustrated. In selected embodiments, the apparatus 1100 may include a processor (CPU) 1102 operatively coupled to a processor memory 1104, which holds binary-coded functional modules for execution by the processor 1102. Such functional modules may include an operating system 1106 for handling system functions such as input/output and memory access, a browser 1108 to display web pages, and media player 1110 for playing video. The modules may further include adaptive bitrate algorithm 114. The memory 1104 may hold additional modules not shown in FIG. 11, for example modules for performing other operations described elsewhere herein.

A bus 1114 or other communication components may support communication of information within the apparatus 1100. The processor 1102 may be a specialized or dedicated microprocessor configured or operable to perform particular tasks in accordance with the features and aspects disclosed herein by executing machine-readable software code defining the particular tasks. Processor memory 1104 (e.g., random access memory (RAM) or other dynamic storage device) may be connected to the bus 1114 or directly to the processor 1102, and store information and instructions to be executed by a processor 1102. The memory 1104 may also store temporary variables or other intermediate information during execution of such instructions.

A computer-readable medium in a storage device 1124 may be connected to the bus 1114 and store static information and instructions for the processor 1102; for example, the storage device (CRM) 1124 may store the modules for operating system 1106, browser 1108, and media player 1110 when the apparatus 1100 is powered off, from which the modules may be loaded into the processor memory 1104 when the apparatus 1100 is powered up. The storage device 1124 may include a non-transitory computer-readable storage medium holding information, instructions, or some combination thereof, for example instructions that when executed by the processor 1102, cause the apparatus 1100 to be configured or operable to perform one or more operations of a method as described herein.

A network communication (comm.) interface 1116 may also be connected to the bus 1114. The network communication interface 1116 may provide or support two-way data communication between the apparatus 1100 and one or more external devices, e.g., the streaming system 1000, optionally via a router/modem 1126 and a wired or wireless connection 1125. In the alternative, or in addition, the apparatus 1100 may include a transceiver 1118 connected to an antenna 1129, through which the apparatus 1100 may communicate wirelessly with a base station for a wireless communication system or with the router/modem 1126. In the alternative, the apparatus 1100 may communicate with a video streaming system 1000 via a local area network, virtual private network, or other network. In another alternative, the apparatus 1100 may be incorporated as a module or component of the system 1000 and communicate with other components via the bus 1114 or by some other modality.

The apparatus 1100 may be connected (e.g., via the bus 1114 and graphics processing unit 1120) to a display unit 1128. A display 1128 may include any suitable configuration for displaying information to an operator of the apparatus 1100. For example, a display 1128 may include or utilize a liquid crystal display (LCD), touchscreen LCD (e.g., capacitive display), light emitting diode (LED) display, projector, or other display device to present information to a user of the apparatus 1100 in a visual display.

One or more input devices 1130 (e.g., an alphanumeric keyboard, microphone, keypad, remote controller, game controller, camera, or camera array) may be connected to the bus 1114 via a user input port 1122 to communicate information and commands to the apparatus 1100. In selected embodiments, an input device 1130 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1128, for example using a touch sensitive screen. A cursor control device may communicate direction information and command selections to the processor 1102 and control cursor movement on the display 1128. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   receiving quality metric values for profile levels in a plurality of profile levels for a segment of content, wherein quality metric values measure a quality characteristic of a segment for each profile level in the plurality of profile levels;
   for the segment, performing:
   evaluating available bandwidth and associated bitrates of profile levels in the plurality of profile levels to select a first profile level in the plurality of profile levels for the segment;
   evaluating the quality metric values for profile levels in the plurality of profile levels to select a second profile level in the plurality of profile levels for the segment, wherein the first profile level is different from the second profile level; and
   selecting a profile level in the plurality of profile levels based on the first profile level and the second profile level, wherein the profile level that is selected is requested for the segment.

2. The method of claim 1, wherein receiving the quality metric values comprises:
   receiving the quality metric values in a communication with information for requesting the segment of content.

3. The method of claim 1, wherein receiving the quality metric values comprises:
   receiving the quality metric values in a communication with information for the plurality of profile levels.

4. The method of claim 1, wherein receiving the quality metric values comprises:
   receiving the quality metric values using a property that is associated with a protocol that is used to send information for the plurality of profile levels.

5. The method of claim 1, wherein evaluating the available bandwidth and the associated bitrates of profile levels in the plurality of profile levels to select the first profile level comprises:
   generating scores for profile levels in the plurality of profile levels based on a comparison of the available bandwidth and a respective bitrate of the profile levels; and
   selecting the first profile level based on the respective scores of the profile levels in the plurality of profile levels.

6. The method of claim 5, wherein generating the scores comprises:
   calculating a rebuffering time for the profile levels in the plurality of profile levels based on the available bandwidth; and
   generating the scores for the profile levels based on the rebuffering time and the respective bitrate of the profile levels.

7. The method of claim 1, wherein evaluating the quality metric values for profile levels in the plurality of profile levels to select the second profile level comprises:
   generating scores for profile levels in the plurality of profile levels based on the quality metric values; and
   selecting the first profile level based on the respective scores of the profile levels in the plurality of profile levels.

8. The method of claim 7, wherein generating the scores comprises:
   calculating a rebuffering time for the profile levels in the plurality of profile levels based on the available bandwidth; and
   generating the scores for the profile levels based on the rebuffering time and the respective quality metric score of the profile levels.

9. The method of claim 1, further comprising:
   calculating a rebuffering time for the profile levels in the plurality of profile levels based on the available bandwidth and a respective bitrate of the profile levels; and
   using the rebuffering time for the profile levels to select the first profile level and the second profile level.

10. The method of claim 1, wherein the segment comprises a first segment, the method further comprising:
    defining a first parameter value for a first time period and a second parameter value for a second time period;
    using the first parameter value when evaluating the quality metric values for profile levels in the plurality of profile levels to select the second profile level for the first segment; and
    using the second parameter value when evaluating the quality metric values for profile levels in the plurality of profile levels to select a third profile level in the plurality of profile levels for a second segment.

11. The method of claim 10, wherein evaluating available bandwidth and associated bitrates of profile levels in the plurality of profile levels to select the first profile level comprises:
    using a third parameter value to select the first profile level.

12. The method of claim 1, wherein the segment comprises a first segment, the method further comprising:
    determining a time period;
    when selecting the profile level for the first segment is within the time period, selecting the profile level using the first profile level and the second profile level; and
    when not within the time period, for a second segment, performing:
    evaluating available bandwidth and associated bitrates of profile levels in the plurality of profile levels to select a third profile level; and selecting the third profile level in the plurality of profile levels without evaluating the quality metric values for profile levels in the plurality of profile levels, wherein the third profile level is requested for the second segment.

13. The method of claim 10, wherein:

the first time period is predicted to be when a content delivery network charges a first price for delivering the content; and the second time period is predicted to be when the content delivery network charges a second price for delivering the content, wherein the second price is lower than the first price.

14. A non-transitory computer-readable storage medium having stored thereon computer executable instructions, which when executed by a computing device, cause the computing device to be operable for:

receiving quality metric values for profile levels in a plurality of profile levels for a segment of content, wherein quality metric values measure a quality characteristic of a segment for each profile level in the plurality of profile levels;

for the segment, performing:

evaluating available bandwidth and associated bitrates of profile levels in the plurality of profile levels to select a first profile level in the plurality of profile levels for the segment;

evaluating the quality metric values for profile levels in the plurality of profile levels to select a second profile level in the plurality of profile levels for the segment, wherein the first profile is different from the second profile; and selecting a profile level in the plurality of profile levels based on the first profile level and the second profile level, wherein the profile level that is selected is requested for the segment.

15. A method comprising:

receiving data for a time from delivery of instances of content;

determining a first period from the data that meets a characteristic;

calculating a quality metric value for profiles in a plurality of profiles for a first segment of an instance of content based on analyzing a characteristic of the first segment; and causing a sending of the first period and the quality metric value for profiles in the plurality of profiles for the first segment and a second segment to a client device, wherein:

during the first period the client device uses available bandwidth and associated bitrates of profile levels in the plurality of profile levels to select a first profile level in the plurality of profiles for the first segment and the quality metric values to select a second profile in the plurality of profiles for the first segment, and selects a profile in the plurality of profiles for the first segment based on the first profile level and the second profile level: and during a second period, the client device uses available bandwidth and associated bitrates of profiles in the plurality of profiles to select a profile in the plurality of profiles for a second segment without evaluating the quality metric values for profiles in the plurality of profile.

16. The method of claim 15, wherein the quality metric value for profiles is based on a characteristic that measures perceived quality of the first segment and the respective profiles.

17. The method of claim 15, wherein causing the sending of the quality metric values for profiles comprises:

causing the quality metric value for profiles to be sent in a communication with information for requesting the first segment of content.

18. The method of claim 17, wherein the quality metric value for profiles are sent using a property of a protocol in the communication.

19. The method of claim 15, wherein causing the sending of the first period comprises:

causing the first period to be sent in a communication with information for requesting the first segment.

20. The method of claim 15, further comprising calculating an average for a profile for multiple segments of the instance of content using the quality metric value for the profile for the multiple segments.

* * * * *